Dec. 18, 1951    J. H. REISNER, JR    2,579,273
MAGNETIC LENS FOR ELECTRON OPTICAL SYSTEMS
Filed May 21, 1949
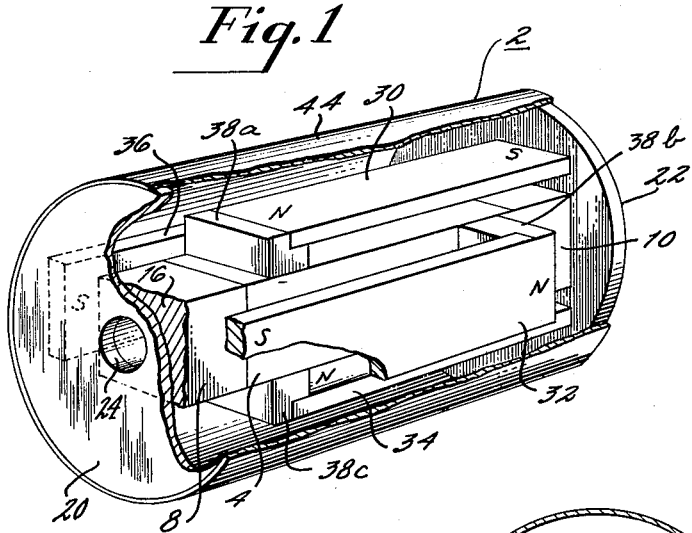
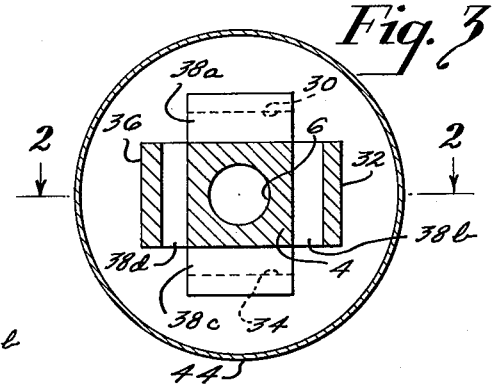
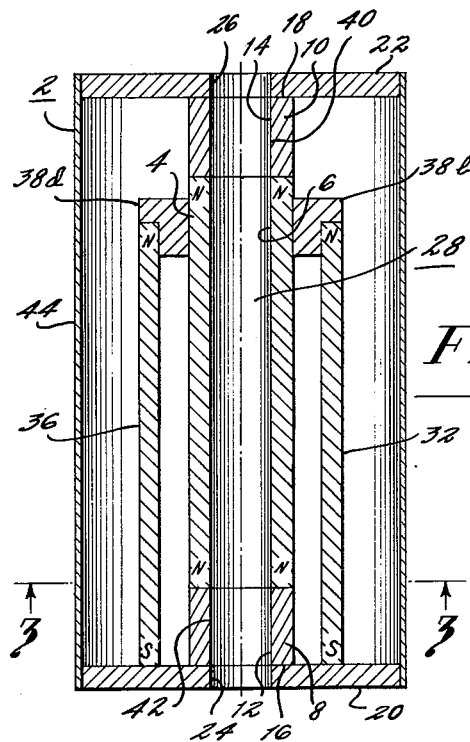
INVENTOR
John H. Reisner, Jr.
BY
ATTORNEY Patented Dec. 18, 1951

2,579,273

UNITED STATES PATENT OFFICE 2,579,273

MAGNETIC LENS FOR ELECTRON OPTICAL SYSTEMS

John H. Reisner, Jr., Haddonfield, N. J., assignor to Radio Corporation of America, a corporation of Delaware Application May 21, 1949, Serial No. 94,556

6 Claims. (Cl. 313—84)

This invention relates to improvements in magnetic lenses for electron optical systems. More particularly, the invention relates to an improved two-gap lens which is especially adapted to the use of permanent magnets for energizing the gaps.

In electron optical apparatus, such as electron diffraction cameras and electron microscopes, electron lenses are used to focus a beam of electrons much as an ordinary optical lens is used to focus a beam of light. Electron lenses may be either electrostatic or magnetic and the latter class includes both electromagnetic and permanent magnetic types.

Although good resolution and very high magnifications are obtainable using electromagnetic lens systems, instruments designed to use this type of system are generally of bulky construction and are both expensive and difficult to operate. For some purposes, somewhat lower orders of magnification are more practical and an instrument which is compact and relatively easy to operate and service is highly desirable. For these reasons, an instrument having permanent magnet lenses is advantageous for some users.

Examples of previous magnetic electron lenses primarily designed to use permanent magnets for energizing the flux gaps are found in United States Patent 2,369,796 and the co-pending application of John H. Reisner, Serial No. 704,089, filed October 18, 1946, which has matured as Patent No. 2,503,173. The present invention offers certain advantages and improvements over the lenses described in either the said patent or the said application.

The improved permanent magnetic lens of the present invention comprises, in general, a spool including end plates of magnetically permeable material, a core spaced from the end plates, both end plates and core having a central passage for the passage of a beam of electrons, and an even number of magnets arranged around the core. These magnets are so connected to the end plates and the core that each of the two flux gaps, located between the end plates and the core, is energized by one-half the magnets in their external circuits and by the other half of the magnets in their internal circuits. Two or any other even number of magnets may be used, and a magnetic shield may be used to surround the magnets. This shield may form part of the external magnetic circuit of each magnet.

One object of the present invention is to provide an improved permanent magnet lens utilizing magnets of relatively high strength.

Another object of the present invention is to provide an improved permanent magnet lens utilizing fewer magnets than most systems have used heretofore.

Another object of the present invention is to provide an improved permanent magnet lens in which the effects of stray flux due to losses in the core iron are substantially avoided.

Another object of the invention is to provide an improved magnetic lens characterized by relative ease of assembly.

A further object of the invention is to provide a two-gap magnetic lens in which the gap strengths are substantially equalized.

These and other objects will be more apparent and the invention will be more readily understood from the following description, including the accompanying drawings, of which:

Figure 1 is a partially cut-away perspective view of one form of lens constructed in accordance with the present invention, Figure 2 is a longitudinal cross section view of the apparatus of Figure 1, taken along the line 2—2 of Figure 3, and Figure 3 is a transverse cross section view of the apparatus of Figure 1, taken along the line 3—3 of Figure 2.

There will now be described a preferred embodiment of apparatus constructed in accordance with the present invention.

Referring, now, to the drawings, there is shown an assembly consisting of a spool 2 which comprises a central elongated core member 4, of a magnetically permeable material such as soft iron, and having a rectangular cross section. Extending longitudinally through the center of the core member is a cylindrical passage 6 which is adapted to pass a stream of electrons. Cemented to both ends of the core member are non-magnetic spacing blocks 8 and 10, each of which has a central cylindrical passage 12 and 14, respectively, forming a continuation of the central passage 6 of the core member. The spacing blocks may be made of brass or other suitable non-magnetic metal.

The spacing blocks 8 and 10 each have outwardly facing ends 16 and 18, respectively, against each of which is cemented a disc-shaped end plate 20 or 22, respectively, of magnetically permeable material, such as soft iron. Each of the end plates 20 and 22 is also provided with a central aperture 24 and 26, respectively, which is in alignment with the passages through the spacing blocks and the core member.

The longitudinal axis of the entire passage 28 through the end plates, spacing blocks, and core member is taken as the axis of the beam of electrons passed therethrough when the spool assembly is made a part of an electron optical system, which may be included in an instrument such as an electron microscope or an electron diffraction camera.

The apparatus of the present invention includes an even number of magnets preferably spaced symmetrically around the core. In the embodiment illustrated in the drawings, there are provided four bar magnets 30, 32, 34, and 36, each having its direction of magnetization parallel to the longitudinal axis of the central passage 28. Each of the magnets 30, 32, 34, and 36 is connected at one of its ends to a longitudinal face of the core member by a similar connecting member 38a, 38b, 38c, and 38d, respectively, of magnetically permeable material such as soft iron. In the case of each magnet, the end opposite to that which is connected to the core abuts one of the end plates.

Adjacent magnets, such as 30 and 32, for example, preferably abut opposite end plates and each of these magnets is also connected to the core member adjacent one of its ends, with each of the two adjacent magnets being connected adjacent a different end of the core member. The two adjacent magnets, if connected such as above described, are also polarized in an opposite sense.

The other adjacent magnets are connected to the end plates and the core in a manner similar to that above described and the four magnets are so arranged that alternately positioned magnets 30—34 and 32—36 are connected to the same end plates and are also connected adjacent the same end of the core. Alternately positioned magnets are also polarized in the same sense.

Flux gaps 40 and 42 energized by the magnets are provided between each end plate and the adjacent end of the core.

The magnets are preferably surrounded by a cylindrically shaped shield 44 of magnetically permeable material, such as soft iron. The ends of the shield are connected to the peripheries of the end plates. The shield not only serves to stop stray magnetic flux from reaching the magnets but also helps to equalize minor differences in the strengths of the magnets.

Each of the magnets may be said to have both an external and an internal magnetic circuit. As more particularly shown in Figure 2, the magnet 36, for example, has an external flux path through part of the end plate 20, the shield, thence through a portion of the other end plate 22, across the flux gap 40 to an end of the core 4, and finally through the connecting member 38d back to the magnet. The internal magnetic circuit of the magnet 36 may be traced from the magnet to the end plate 20, through a part of this end plate across the flux gap 42 to the core 4, along the core and back to the magnet through the connecting member 38d.

It will be apparent that the flux gap 40 is energized by the external magnetic circuit of the magnet, while the flux gap 42 is energized by the internal magnetic circuit of the magnet. It will also be apparent that, since adjacent magnets are polarized in an opposite sense, and also connected in an opposite sense, each flux gap will be energized by the external magnetic circuit of half of the magnets and by the internal magnetic circuit of the other half of the magnets.

In the system which has been described, it is possible to use any even number of magnets. If only two magnets are used, it is preferable, for purposes of symmetry, to position them on opposite sides of the core member.

It is also preferable, for maximum symmetry, to have adjacent magnets abut opposite end plates as described in the example, although this is not absolutely necessary.

The improved lens of the present invention offers certain general advantages leading to excellent performance. Some of these advantages are: that the flux gaps will be equally energized, both ends of the core member will be at the same magnetic potential, both openings in the end plates will also be at the same magnetic potential, and there will be substantially no stray flux present between the ends of the core member.

The improved lens of the present invention also offers certain specific advantages over previously known permanent magnet lens systems. One of these advantages is that the core member is energized from both ends, which results in reduced stray field along the interior of the core member. This is an improvement over those systems which energize the core member at its center point and also over those systems which energize the core at only one end.

Another specific advantage is that, although utilizing the principle of bucking magnets, assembly troubles are greatly reduced, since it is necessary to register the magnets against only one end plate. The magnetically permeable members, connecting the magnets to the core member, may be made movable. With some previous systems, utilizing bucking magnets, it is necessary to control the lengths of the magnets, end blocks, and spool so that the components of the magnetic circuits fit closely.

Still another, and very important, advantage of the lens of the present invention is that it is possible to choose the length and area of the energizing magnets to produce operation of the magnets at the point of optimum efficiency. For certain external dimensions, in order to have optimum efficiency, it is desirable to have the length of the magnet greater than half the distance between end plates. Although under some previous systems this is not possible, under the system of the present invention, it is possible to use magnets having a length up to 70 percent of this distance. One of the principal improvements contemplated by the present invention is that the bar magnets may be connected to the core member adjacent one of its ends rather than at the mid-point. Although the exact point of contact may be varied, it is intended that the connecting members 38a to 38d be positioned between the mid-point of the core and the end of the core opposite the end plate which the magnet abuts.

There has thus been described an improved magnetic lens system of simple design which is easier to assemble and which is capable of improved operation compared to previously proposed electron lens systems.

I claim as my invention:

1. A permanent magnet lens for use in an electron optical system, comprising a core piece of magnetically permeable material having a passage adapted to pass a stream of electrons therethrough, end plates of magnetically permeable material, each of which has an opening in register with an end of said passage and each of said end plates being spaced from an end of said core piece, flux gaps located between the ends of said core piece and said end plates, means for energizing said gaps, said energizing means comprising an even number of magnets, each having a direction of magnetization substantially parallel to the longitudinal axis of said passage, one-half of said magnets being polarized in one sense and the other half being polarized in the opposite sense, each of said magnets having a length greater than half the distance between said end plates, one-half of said magnets being connected adjacent one end of said core piece and to the same one of said end plates, while the other half of said magnets is connected adjacent the opposite end of said core piece and to the other one of said end plates.

2. A lens according to claim 1, in which said magnets are arranged symmetrically about said axis with adjacent magnets being connected adjacent opposite ends of said core and to opposite end plates.

3. A lens according to claim 1, including a shield of magnetically permeable material surrounding said magnets and connected to said end plates.

4. A magnetic lens for use in an electron optical system, comprising an elongated core member of magnetically permeable material having a passage adapted to pass a stream of electrons therethrough, end plates of magnetically permeable material, each of which has an opening in register with an end of said passage and each of said plates being spaced from an end of said core member, flux gaps located between the ends of said core member and said end plates, and magnet means for energizing said gaps, said magnet means having a direction of magnetization substantially parallel to the longitudinal axis of said passage and said magnet means being connected to said core member adjacent the ends thereof such that said core member is energized from both ends adjacent the ends of said passage.

5. A permanent magnet lens for use in an electron optical system, comprising a core member of magnetically permeable material having a passage adapted to pass a stream of electrons therethrough, end plates of magnetically permeable material, each of which has an opening in register with an end of said passage and each of said end plates being spaced from an end of said core member, flux gaps located between the ends of said core member and said end plates, means for energizing said gaps, said energizing means comprising an even number of magnets, each having an external and an internal magnetic circuit, said magnets being connected to said end plates and to said core member such that each of said flux gaps is energized by one-half of said magnets in their external circuits and by the other half of said magnets in their internal circuits.

6. A permanent magnet lens comprising a core member of magnetically permeable material having a passage adapted to pass a stream of electrons therethrough, end plates of magnetically permeable material spaced from the ends of said core member and each having a central opening in register with an end of said passage, flux gaps located between the ends of said core member and said end plates, means for energizing said gaps, said energizing means comprising an even number of magnets, a magnetic shield connected to said end plates and surrounding said energizing means, external and internal magnetic circuits associated with each of said magnets, said shield being included in said external circuits and said core being included in said internal circuits, said magnets being connected to said end plates and to said core member such that each of said flux gaps is energized by one-half of said magnets in their external circuits and by the other half of said magnets in their internal circuits.

JOHN H. REISNER, Jr.

REFERENCES CITED

The following references are of record in the file of this patent:

UNITED STATES PATENTS

| Number | Name | Date |
| --- | --- | --- |
| 2,200,039 | Nicoll | May 7, 1940 |
| 2,305,761 | Borries et al. | Dec. 22, 1942 |
| 2,369,782 | Hillier | Feb. 20, 1945 |
| 2,369,796 | Ramberg | Feb. 20, 1945 |
| 2,503,173 | Reisner | Apr. 4, 1950 |
| 2,533,687 | Quam | Dec. 12, 1950 |
| 2,533,688 | Quam | Dec. 12, 1950 |
| 2,533,689 | Quam | Dec. 12, 1950 |